US006612539B1

(12) United States Patent
Ruehle et al.

(10) Patent No.: US 6,612,539 B1
(45) Date of Patent: Sep. 2, 2003

(54) FUEL INJECTION VALVE

(75) Inventors: Wolfgang Ruehle, Ditzingen (DE); Juergen Ulm, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/743,313

(22) PCT Filed: Dec. 2, 1999

(86) PCT No.: PCT/DE99/03869

§ 371 (c)(1),
(2), (4) Date: Apr. 4, 2001

(87) PCT Pub. No.: WO00/68564

PCT Pub. Date: Nov. 16, 2000

(30) Foreign Application Priority Data

May 8, 1999 (DE) ........................................ 199 21 489

(51) Int. Cl.[7] ................................................ F16K 31/02

(52) U.S. Cl. ................. 251/64; 251/129.06; 239/102.2; 310/326

(58) Field of Search .............................. 251/64, 129.06; 239/102.2, 585.1; 310/326, 328

(56) References Cited

U.S. PATENT DOCUMENTS

| | | | | | |
|---|---|---|---|---|---|
| 4,669,660 | A | * | 6/1987 | Weber et al. | 239/102.2 |
| 4,678,000 | A | * | 7/1987 | Kushida | 251/129.06 X |
| 4,750,706 | A | * | 6/1988 | Schlagmuller | 251/129.06 |
| 4,798,188 | A | * | 1/1989 | Ito et al. | 239/585.4 X |
| 4,878,650 | A | * | 11/1989 | Daly et al. | 251/129.15 |
| 4,994,698 | A | * | 2/1991 | Kliman et al. | 310/326 X |
| 5,199,641 | A | * | 4/1993 | Hohm et al. | 239/102.2 |
| 5,803,370 | A | | 9/1998 | Heinz et al. | |

FOREIGN PATENT DOCUMENTS

| | | |
|---|---|---|
| DE | 197 35 232 | 2/1999 |
| WO | WO 89 10478 | 11/1989 |

* cited by examiner

*Primary Examiner*—Ehud Gartenberg
*Assistant Examiner*—Eric Keasel
(74) *Attorney, Agent, or Firm*—Kenyon & Kenyon

(57) ABSTRACT

A fuel injector, particularly an injector for a fuel injection system of an internal combustion engine, includes a piezoelectric or magnetostrictive actuator and a valve closure member which is actuable by the actuator with the aid of a valve needle and which is cooperable with a valve-seat surface to form a sealing seat. An electromagnetic damping device is provided for damping the movement of the valve needle.

11 Claims, 5 Drawing Sheets

FUEL INJECTION VALVE

FIELD OF THE INVENTION

The present invention concerns a fuel injector.

BACKGROUND INFORMATION

A fuel injector is discussed in International Patent Application No. WO895/0478. The damping device discussed in this document is made of a pot-shaped damping element, a weak compression spring having a low spring coefficient and a strong compression spring having a high spring coefficient. The two compression springs are staggered axially relative to each other and surround the valve needle by sections. The pot-shaped damping element is situated between the two compression springs which act on the pot-shaped damping element in opposite direction and which, on the side facing away from the pot-shaped damping element, are in each case braced against support elements applied to the valve needle. The weak compression spring counteracts the closing of the fuel injector, the strong compression spring counteracts the opening of the fuel injector. Formed between the edge of the damping element and the inner wall of the valve housing is a narrow, circumferential gap, extending in the axial direction, which is filled with fuel. Therefore, in response to movement of the damping element, a shear force develops in the fuel liquid between the edge of the damping element and the inner wall of the valve housing, the shear force producing a frictional force which counteracts the movement of the damping element. In cooperation with the compression springs, damping of the valve needle is thus achieved.

The known fuel injector has the following disadvantages: The damping force is permanently predefined by the spring force and the shear force, and therefore cannot adapt to the performance quantities of the internal combustion engine; in particular, it is not variably adjustable as a function of time. Since the fuel inflow in the direction of the sealing seat is influenced by the damping plate, flow eddies occur in the fuel, thus causing the moldability of the fuel discharge to deteriorate. A fuel inlet below the damping plate, suggested in WO 89/10478 as an alternative, is believed to be impractical, since it may markedly increase the size of the valve housing on the discharge side. Furthermore, due to the additional mechanical components, the fuel injector is more susceptible to wear, especially since the damping force is dependent on the width of the gap formed between the edge of the damping element and the inner wall of the valve housing.

In U.S. Pat. No. 5,236,173 is discussed a clamping spring in the form of a disc spring between the valve-seat member and a valve-seat support on which the valve-seat member is mounted, so that the valve-closure member strikes gently against the valve-seat surface formed on the valve-seat member. However, the disadvantage of this type of damping is that, after the valve-closure member has struck, the valve-seat member swings through in the spray direction, while the valve-closure member either comes to a standstill, or, because of the reversal in impetus, moves back from the valve-seat member contrary to the spray direction. For this reason, valve bouncing can even occur in increased measure with this fuel injector design, so that this type of damping has not proven to be very worthwhile.

SUMMARY OF THE INVENTION

The fuel injector of an exemplary embodiment of the present invention is believed to have the advantage that the fuel injector is debounced in a satisfactory manner. In addition, the electromagnetic damping device requires no mechanically stressed components such as compression springs and disc springs, and needs no damping fluid. Furthermore, the damping device is temperature-stable and permits a variable damping force.

The damping device advantageously has an excitation coil for generating a magnetic field, and at least one electroconductive induction loop arranged on the valve needle. In this manner, the electromagnetic field necessary for the damping can be generated in a simple manner. In addition, the damping force can act directly on the valve needle.

It is advantageous that the excitation coil is wound onto a valve housing of the fuel injector, the valve housing having a circumferential groove for this purpose. This results in an accommodation of the excitation coil which is simple from a standpoint of production engineering, and in which the excitation coil is well protected and can easily be replaced.

Another advantage is that the electric conductivity of the induction loop is greater than the electric conductivity of the valve needle. A loop voltage induced in the induction loop thereby produces an electrical induction current conducted in the induction loop.

It is also advantageous that the induction loop is electrically insulated from the valve needle. The electromotive force is thus particularly well utilized.

A further advantage is that the induction loop is sleeve-shaped and surrounds the valve needle by sections. This results in an induction-loop form which is adapted to the geometry of the injector valve, and which also permits simple mounting on the valve needle.

The axial length of the induction loop along the valve axis is advantageously less than the axial length of the excitation coil along the valve axis. A greater loop voltage is thereby induced in the sleeve.

A control unit advantageously has a current regulation for the current-regulated driving of the excitation coil and/or the actuator. This permits an exact, quickly reacting control of the damping force acting on the valve needle.

To utilize the displacement current developing in response to the compression of the actuator, the excitation coil is advantageously connected in series to the actuator. Thus, the energy stored in the actuator can be used for damping the valve needle.

DETAILED DESCRIPTION

Figure 1:
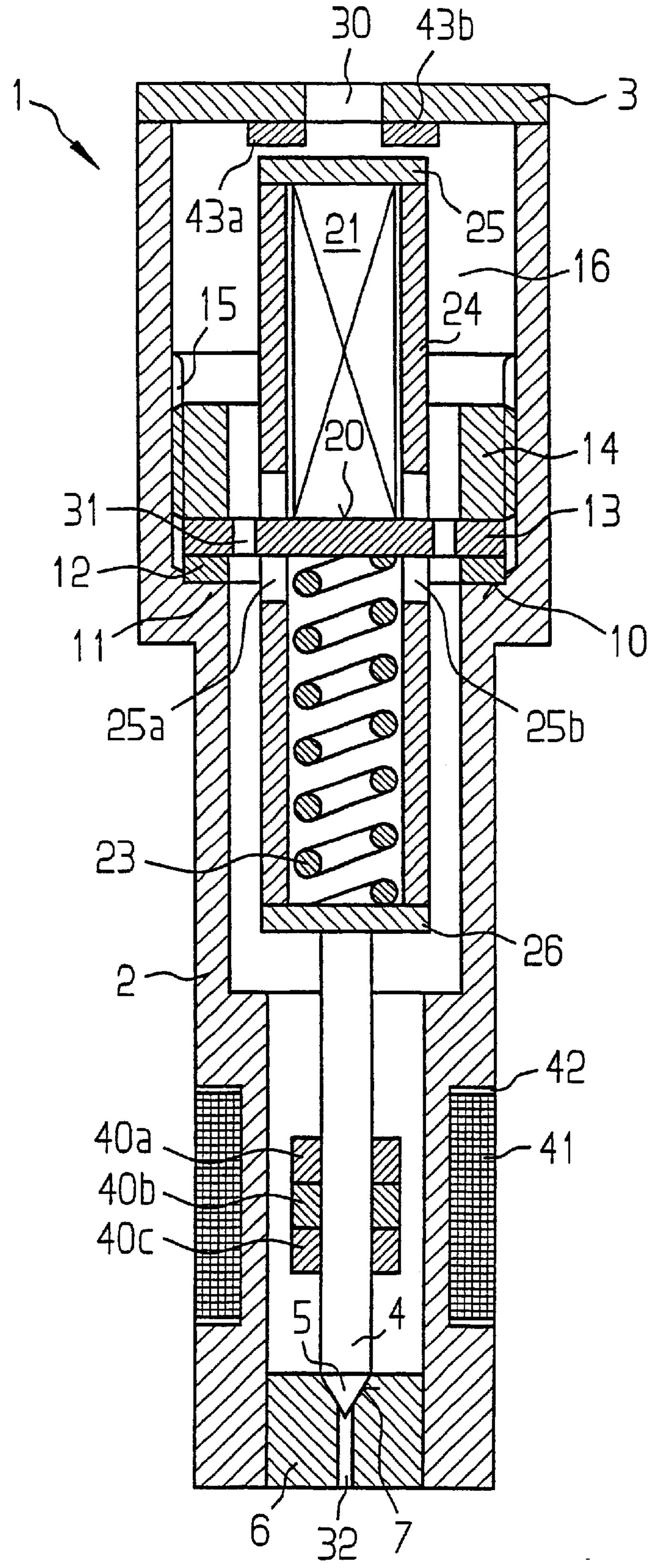
FIG. 1 shows a partial axial intersection through a first exemplary embodiment of a fuel injector according to the present invention, the fuel injector being designed to open to the inside.

FIG. 1, in a partial axial sectional view, shows a fuel injector 1 according to to an exemplary embodiment of the present invention. Fuel injector 1, as a so-called gasoline direct injection valve, is used in particular for the direct injection of fuel, especially gasoline, into a combustion chamber of a mixture-compressing internal combustion engine having externally supplied ignition. However, fuel injector 1 of an exemplary embodiment of the present invention is also suitable for other application cases.

Fuel injector 1 is designed to open to the inside. Fuel injector 1 has a valve housing 2 and an end cover plate 3. Disposed in valve housing 2 is a valve-closure member 5 that can be actuated by an axially movable valve needle 4, and that in the exemplary embodiment shown, is formed in one piece with valve needle 4. Valve-closure member 5 tapers frustoconically in the spray direction. Valve-closure member 5 cooperates with a valve-seat surface 7, formed on a valve-seat member 6, to form a sealing seat. In this context, valve-seat member 6 is secured in the front part of valve housing 2.

Disposed on an inner contact surface 10, which is formed on a projection 11 of valve housing 2, is a contact element 12. Contact element 12 can be designed to be plastically or elastically deformable. An intermediate plate 13 is secured in interior 16 of fuel injector 1 by a screw element 14. Intermediate plate 13 is pressed by screw element 14 against contact element 12, thereby deforming contact element 12. To apply the force necessary for this purpose, screw element 14 is screwed into an internal screw thread 15 formed on the inner side of valve housing 2.

A piezoelectric actuator 21 abuts against end face 20 of intermediate plate 13 on the inflow side, and a compression spring 23 abuts against the end face of intermediate plate 13 on the sealing-seat side. Actuator 21 and compression spring 23 are enclosed by a tubular housing wall 24 which has openings 25*a*, 25*b* through which intermediate plate 13 projects. Tubular housing wall 24 is joined to a housing plate 25 on the inflow side and a housing plate 26 on the sealing-seat side. Together, tubular housing wall 24, housing plate 25 on the inflow side and housing plate 26 on the sealing-seat side form an inner housing 24, 25, 26. In this context, actuator 21 acts on inner housing 24, 25, 26 via housing plate 25 on the inflow side, and compression spring 23 acts on inner housing 24, 25, 26 via housing plate 26 on the sealing-seat side. Valve needle 4 is secured to housing plate 26 on the sealing-seat side.

The fuel is conducted into interior 16 of fuel injector 1 via a bore hole 30 in end cover plate 3. From there, it is conducted via at least one bore hole 31 in intermediate plate 13 in the direction of the sealing seat formed of valve-seat surface 7 and valve-closure member 5. Actuator 21 expands in response to actuation, thereby shifting inner housing 24, 25, 26 in the direction of end cover plate 3, and valve-closure member 5 secured to valve needle 4 lifts off from valve-seat surface 7, thereby opening the sealing seat. Fuel arrives, via the resulting gap between valve-seat surface 7 and valve-closure member 5, into a spray-discharge channel 32, through which it emerges from fuel injector 1 into a combustion chamber of an internal combustion engine. Fuel injector 1 is closed via compression spring 23, which acts on inner housing 24, 25, 26 contrary to actuator 21, which means inner housing 24, 25, 26 shifts in the direction of valve-seat member 6, and valve-closure member 5 of valve needle 4 is moved onto valve-seat surface 7 of valve-seat member 6. In this manner, the sealing seat, formed of valve-seat surface 7 and valve-closure member 5, closes.

In this exemplary embodiment, the electromagnetic damping device of the present invention for damping the movement of valve needle 4 is formed of sleeves 40*a* through 40*c*, and an excitation coil 41 which is wound in a circumferential groove 42 onto valve housing 2 of fuel injector 1.

To restrict the opening cross-section during the opening of fuel injector 1, the movement of valve needle 4 is usually limited by a suitable limit stop. In the exemplary embodiment shown, this limiting is depicted in a simplified manner by the striking of housing plate 25 on the inflow side against stop elements 43*a*, 43*b*. Upon closing fuel injector 1, valve-closure member 5 of valve needle 4 strikes against valve-seat surface 7 of valve-seat member 6. Because of the kinetic momentum during the opening and closing, without a damping device 40*a* through 40*c*, 41 of an exemplary embodiment of the present invention, bouncing of valve needle 4 occurs, which means the sealing seat is not opened with a constant opening cross-section and is not closed abruptly.

The functional principle of the damping device according to an exemplary embodiment of the present invention is explained below in the description with respect to FIG. 3. To boost the damping force, sleeves 40*a* through 40*c* are electrically insulated against each other and against valve needle 4. For example, this insulation can be effected by a lacquer or an oxide layer. If the space around sleeves 40*a* through 40*c* is filled with fuel, a suitable sealing for the sleeves against the fuel can be provided. Alternatively, it is possible to manufacture sleeves 40*a* through 40*c* from a material which exhibits a higher electric conductivity than valve needle 4.

Figure 2:
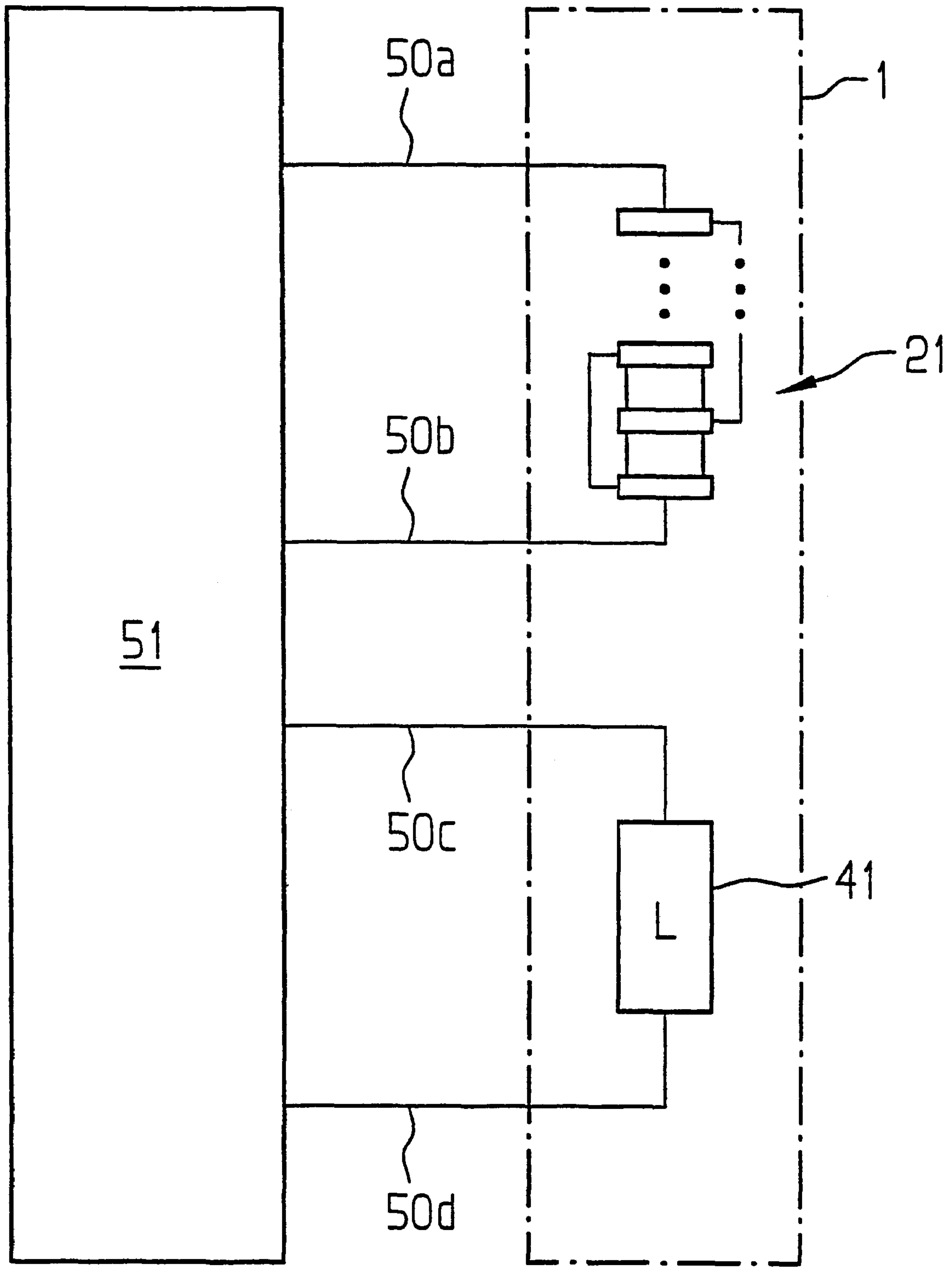
FIG. 2 shows an exemplary embodiment of a control of a fuel injector according to the present invention.

FIG. 2 shows an operating diagram which, in simplified manner, depicts the wiring configuration of actuator 21 and excitation coil 41. To apply an electrical control voltage to actuator 21, electrical supply leads 50*a*, 50*b* are run into fuel injector 1 to actuator 21. In addition, electrical supply leads 50*c*, 50*d* are run into fuel injector 1 to excitation coil 41. Electrical supply leads 50*a* through 50*d* are connected to a control unit 51. It is advantageous if control unit 51 drives coil 41 in a current-controlled fashion, since in this manner, in response to a change in current intensity $I_L$, coil inductance 11 can be counteracted by a correspondingly high voltage of control unit 51, which is conducted to coil 41 via electrical supply leads 50*c*, 50*d*. In addition, to protect electrical supply leads 50*a* through 50*d* and the winding of coil 41 from thermal overloading, it is useful to regulate the current in a current-limited manner. Using control unit 51, it is possible, as a function of the performance quantities of the internal combustion engine, to drive actuator 21 and coil 41 in a manner that they are adjusted to one another, in order to prevent valve needle 4 from bouncing.

Figure 3:
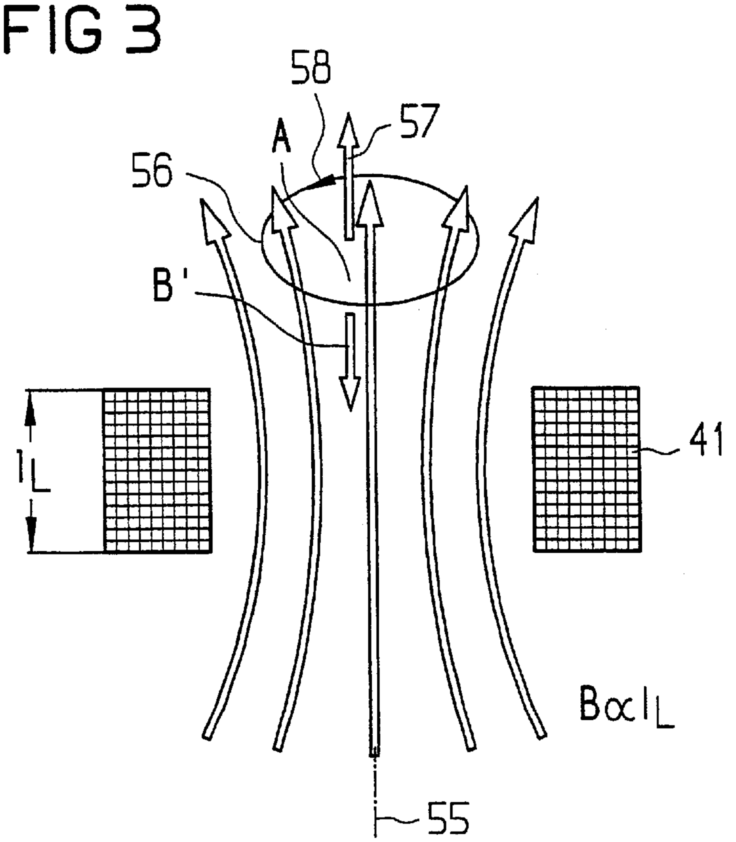
FIG. 3 shows a schematic sketch for clarifying the functioning method of an exemplary embodiment of a fuel injector according to the present invention.

FIG. 3 shows a schematic sketch for clarifying the functional principle of the damping device of fuel injector 1. A current $I_L$ flowing in excitation coil 41 generates a radially symmetric magnetic field B which is proportional to coil current $I_L$. An inhomogeneous magnetic field B results due to the finite length $I_L$ of coil 41 in the axial direction, a marked change in magnetic field B on coil axis 55 being present, given a location change on the order of magnitude of length $I_L$ of coil 41. Located in magnetic field B is an induction loop 56 which represents the edge of a not necessarily planar area A. Of the two sides of area A, one can be arbitrarily defined as the outer side, thereby predefining a direction 57 of area A. A sense of rotation 58 of induction loop 56 is given by direction 57 of area A. Magnetic field B, which penetrates area A, generates a magnetic flux Φ through induction loop 56. Magnetic flux Φ through induction loop 56 is changed by changing coil current $I_L$ and/or by moving induction loop 56. According to Faraday's law of induction, a time change of magnetic flux Φ, which flows through induction loop 56, generates in induction loop 56 an electrical loop voltage which is contrary to sense of rotation 58 of induction loop 56 and is proportional to the time change of magnetic flux Φ. In induction loop 56, the loop voltage generates an electrical current which, in response to an increase of magnetic flux Φ, is directed oppositely to sense of rotation 58, thereby generating a magnetic field B'. In response to a time increase (decrease) in magnetic flux Φ, magnetic field B' is oriented in the opposite (same) direction as magnetic field B. In the case of oppositely directed magnetic fields B, B', induction loop 56 is repulsed by excitation coil 41; in the case of unidirected magnetic fields B, B', induction loop 56 is attracted by excitation coil 41.

To summarize, in response to an increase in magnetic flux Φ, induction loop 56 is repulsed by excitation coil 41, and in response to a decrease in magnetic flux Φ, induction loop 56 is attracted by excitation coil 41. According to an exemplary embodiment of the present invention, force $K_0$ associated with this is utilized for damping valve needle 4.

Figure 4:
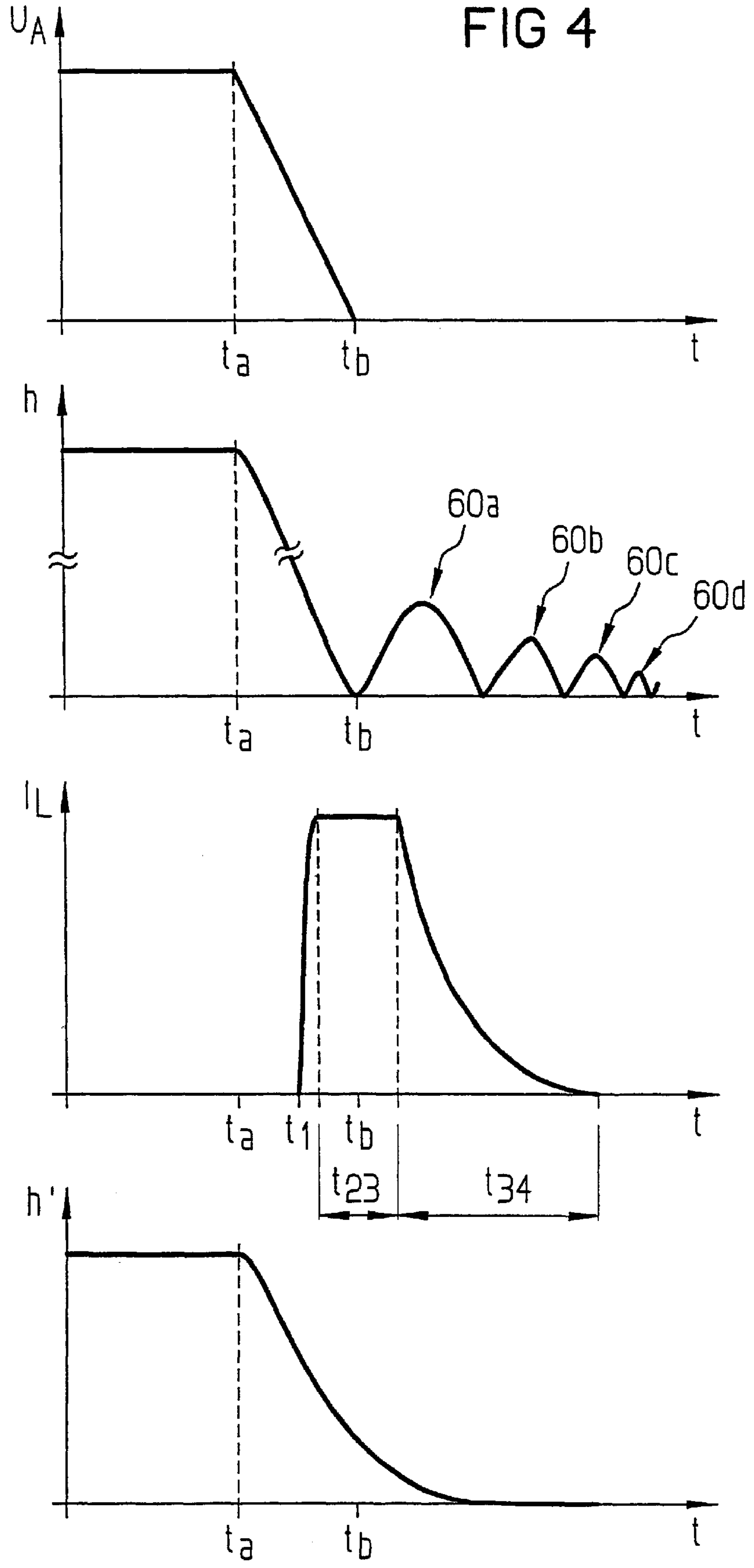
FIG. 4 shows diagrams for clarifying an exemplary embodiment of a fuel injector according to the present invention.

FIG. 4 shows diagrams, by which the functioning method of the damping device according to fuel injector 1 is clarified. In this context, time t is plotted in each case on the abscissa, and the various performance quantities of fuel injector 1 are plotted on the ordinates. For the sake of simplicity, in the following only the closing operation of fuel injector 1 is considered. The functioning method of the damping device of fuel injector 1 can be transferred correspondingly to the opening operation. In the open state of fuel injector 1, an electrical actuator voltage $U_A$ is applied to actuator 21 up to point of time $t_a$. Since actuator voltage $U_A$ is constant up to point of time $t_a$, the position of valve needle 4 also remains unchanged, which corresponds to a constant valve-needle lift h. To close fuel injector 1, actuator voltage $U_A$ is reduced at point of time $t_a$ up to point of time $t_b$, starting from value $U_A$ ($t_a$) to value $U_A$ ($t_b$)=0. As of point of time $t_b$, actuator 21 is de-energized. From point of time $t_a$ up to point of time $t_b$, fuel injector 1 is being closed, which means lift h of valve needle 4 decreases. In the case of an undamped fuel injector 1, bouncing of valve needle 4 occurs thereby raising valve needle 4 from the sealing seat, which corresponds to additional lift movements 60*a* through 60*d*.

At point of time $t_1$, which can also be less than or equal to point of time $t_a$, current $i_I$ of excitation coil 41 is switched on for damping valve needle 4. In this context, the effective damping force upon switching on excitation coil 41 is negligible compared to the actuator force of actuator 21. During time interval $t_{23}$, a constant magnetic field U is generated by excitation coil 41, so that valve needle 4 is damped by the movement of induction loop 56 which is formed by sleeves 40*a* through 40*c*. Therefore, for lift h' of damped valve needle 4, a closing operation results which proceeds free of bouncing, and thus exhibits no additional valve-needle lifts 60*a* through 60*d*. During time interval $t_{34}$, current $I_L$ of excitation coil 41 is slowly reduced, in order not to transfer any power peaks to the valve needle.

Figure 5:
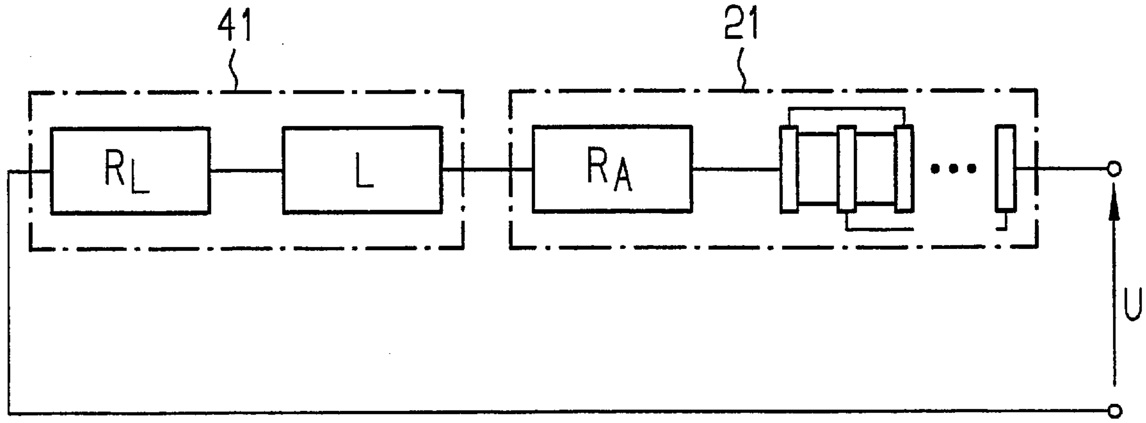
FIG. 5 shows a circuit diagram for an exemplary embodiment of a fuel injector according to the present invention.

FIG. 5 shows an alternative circuit arrangement for the wiring of fuel injector 1 according to exemplary embodiment of the present invention, in which excitation coil 41 is connected in series to actuator 21 in order utilize the displacement current developing during the compression of actuator 21. A substitute circuit diagram made up of a non-dissipative inductance L and a dissipative resistance $R_L$ is shown for excitation coil 41, while a substitute circuit diagram made up of a non-dissipative capacitance C and a dissipative resistance $R_A$ is shown for actuator 21.

It is noteworthy that, upon feeding an external voltage U through inductance L of excitation coil 41, at first only a part of external voltage U acts on actuator 21, and the voltage dropping at actuator 21 only gradually approximates external voltage U. The time scale of the approximation is given from the quotient of inductance L of excitation coil 41 and the sum of actuator resistance $R_A$ and coil resistance $R_L$. In response to the compression of actuator 21, the capacitance of actuator 21 changes, thereby changing the charge applied to actuator 21, and thus an electrical displacement current develops. Since the currents occurring in response to a change in the length of actuator 21 are usually very great, correspondingly great magnetic fields can be generated with excitation coil 41.

Figure 6:
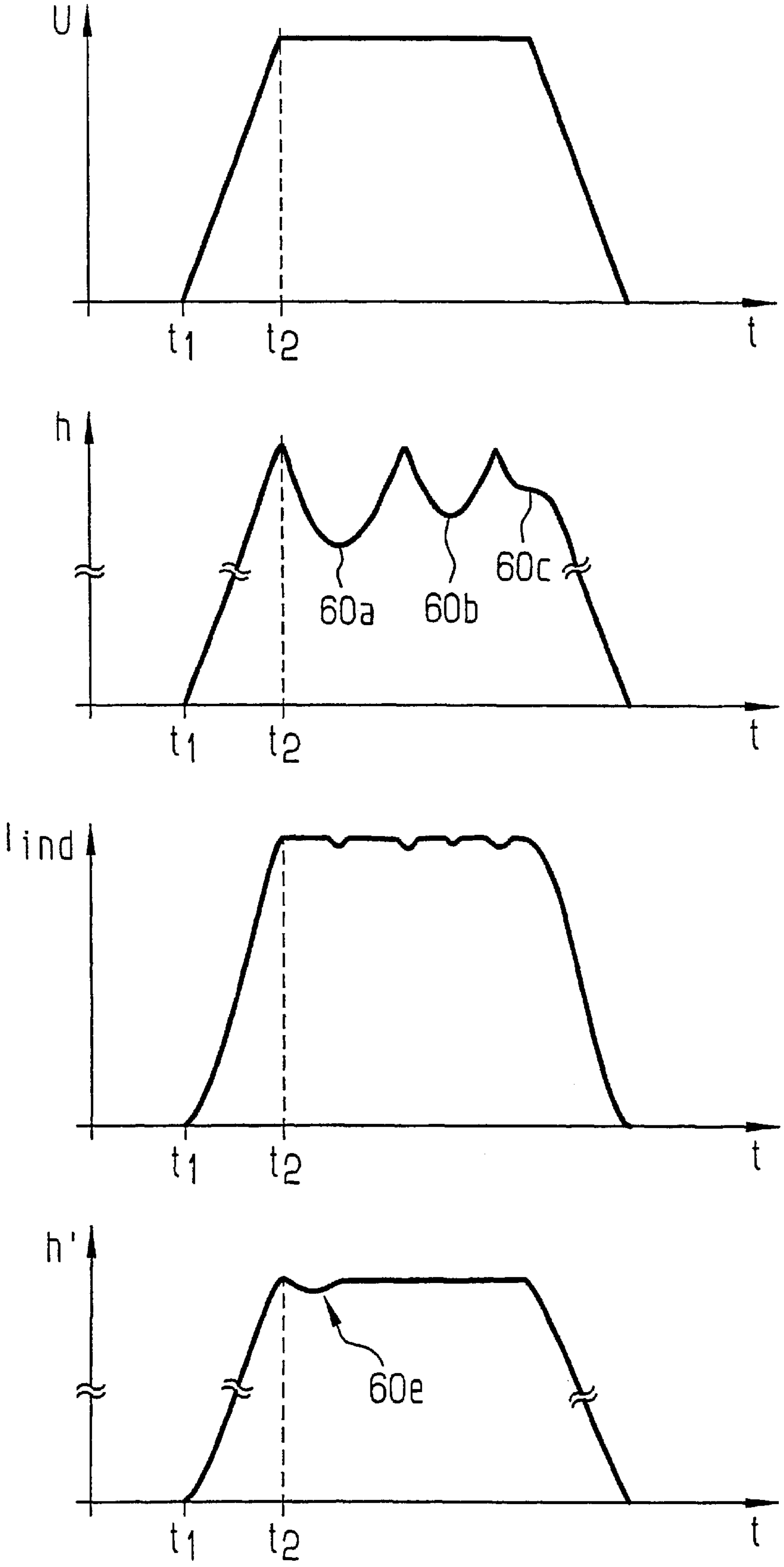
FIG. 6 shows diagrams for clarifying an exemplary embodiment of a fuel injector according to the present invention.

The functioning of the damping device according to the invention when it is interconnected as in FIG. 5 is depicted by the diagrams shown in FIG. 6. The opening operation of fuel injector 1 is considered for this exemplary embodiment. However, the functional principle can be transferred to the closing of fuel injector 1, as well. In each case, time t is plotted on the abscissa in the diagrams.

To open fuel injector 1, voltage U is increased at point of time $t_1$, up to point of time $t_2$. Because of this, lift h of valve needle 4 increases. In the case of an undamped fuel injector 1, valve needle 4 bounces after fuel injector 1 has opened, whereby additional valve-needle lifts 60*a* through 60*c* occur. The induction current is thereby generated in induction loop 56, i.e. in sleeves 40*a* through 40*c*. Valve needle 4 is damped by induction current $I_{ind}$. The time profile of lift h' of valve needle 4 therefore exhibits no additional valve-needle lifts 60*a* through 60*c* which result from the bouncing of valve needle 4. Consequently, at most a weak additional valve-needle lift 60*e* occurs.

The present invention is not limited to the exemplary embodiments described. In particular, the present invention is also suitable for a fuel injector 1 opening to the outside. The damping device does not necessarily have to act directly on valve needle 4, and can also be arranged differently in fuel injector 1. Instead of an induction loop 56, it is also possible to arrange on valve needle 4 a permanent magnet which, together with excitation coil 41, forms an electromagnetic damping device. Induction loop 56 can also be formed by a wound coil instead of by sleeves 40*a*–40*c*.

What is claimed is:

1. A fuel injector for a fuel injection system of an internal combustion engine, the fuel injector comprising:

an actuator, the actuator being one of a piezoelectric actuator and a magnetostrictive actuator;

a valve needle;

a valve-seat surface;

a valve closure member actuatable by the actuator using the valve needle and cooperable with the valve-seat surface to form a sealing seat; and an electromagnetic damping device for damping movement of the valve needle, wherein the damping device surrounds the valve needle.

2. A fuel injector for a fuel injection system of an internal combustion engine, the fuel injector comprising:

an actuator, the actuator being one of a piezoelectric actuator and a magnetostrictive actuator;

a valve needle;

a valve-seat surface;

a valve closure member actuatable by the actuator using the valve needle and cooperable with the valve-seat surface to form a sealing seat;

a damping device for damping movement of the valve needle, wherein the damping device functions electromagnetically; and at least one electroconductive induction loop arranged on the valve needle, wherein the damping device includes an excitation coil for generating a magnetic field.

3. The fuel injector of claim 2, further comprising a valve housing having a circumferential groove for winding the excitation coil onto the valve housing.

4. The fuel injector of claim 2, wherein an electrical conductivity of the electroconductive induction loop is greater than another electrical conductivity of the valve needle.

5. The fuel injector of claim 2, wherein the electroconductive induction loop is electrically insulated from the valve needle.

6. The fuel injector of claim 2, wherein the electroconductive induction loop includes a short-circuited induction coil.

7. The fuel injector of claim 2, wherein the excitation coil is connected in series to the actuator using a displacement current developed in response to a compression of the actuator.

8. The fuel injector of claim 2, wherein the induction loop is a sleeve-shaped induction loop surrounding the valve needle by sections.

9. The fuel injector of claim 8, wherein a length of the sleeve-shaped induction loop along a valve axis is less than another length of the excitation coil along the valve axis.

10. The fuel injector of claim 2, wherein the excitation coil and the actuator is driven by a control unit.

11. The fuel injector of claim 10, wherein the control unit includes a current regulation arrangement for providing current-regulated driving of at least one of the excitation coil and the actuator.

* * * * *